Sept. 17, 1940.  A. A. LOWEKE  2,214,966
FLUID PRESSURE PRODUCING DEVICE
Filed Oct. 8, 1937  2 Sheets-Sheet 1
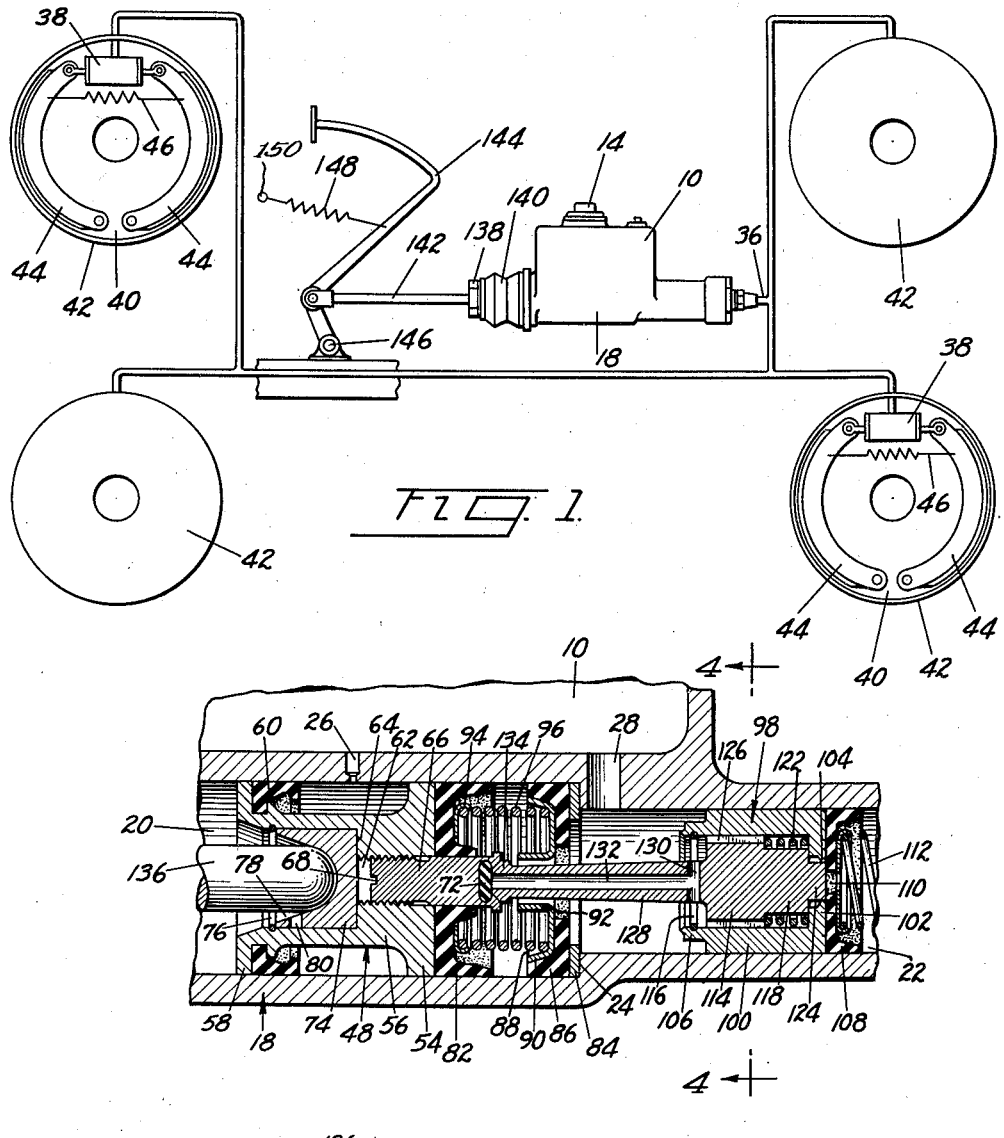
INVENTOR.
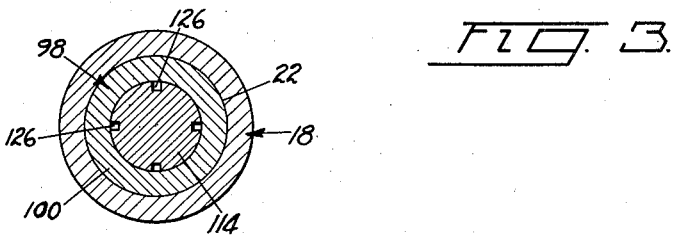
AARON A. LOWEKE
BY Williams, Bradbury, McCall & Hinkle
ATTORNEYS.

Sept. 17, 1940.　　　A. A. LOWEKE　　　2,214,966
FLUID PRESSURE PRODUCING DEVICE
Filed Oct. 8, 1937　　　2 Sheets-Sheet 2

INVENTOR.
AARON A. LOWEKE
BY Williams, Bradbury, McCaleb & Hinkle
ATTORNEYS.

Patented Sept. 17, 1940

2,214,966

UNITED STATES PATENT OFFICE 2,214,966

FLUID PRESSURE PRODUCING DEVICE

Aaron A. Loweke, Detroit, Mich., assignor to Hydraulic Brake Company, Detroit, Mich., a corporation of California Application October 8, 1937, Serial No. 167,885

5 Claims. (Cl. 60—54.6)

This invention relates to fluid pressure braking systems, and more particularly to fluid pressure producing devices therefor.

Broadly the invention comprehends a fluid pressure braking system including a fluid pressure producing device of the compound type comprising a large chamber and a relatively small chamber, a piston reciprocable in each of the chambers, and means for actuating the pistons, preferably a conventional foot pedal lever. In such devices the ratio of pedal travel to the fluid flow changes at a predetermined point in the pedal travel to produce a greater fluid pressure without proportionately greater applied force on the foot pedal lever. Generally the transition from low to high pressure takes place very suddenly, and this condition is undesirable because it inhibits a smooth operation of the system.

An object of the invention is to provide a compound fluid pressure producing device wherein transition from low to high pressure may be so effected as to smooth out the operation of the system.

Another object of the invention is to provide a fluid pressure producing device of the compound type including a low pressure producing means, a high pressure producing means, and means for reducing pressure in the low pressure producing means proportionately to increase of pressure in the high pressure producing means.

A feature of the invention is a low pressure producing means, a high pressure producing means, and a pin cooperating with an orifice effective to meter fluid from the low pressure producing means in increments so as to gradually reduce the pressure on the fluid therein.

Other objects and features of the invention will be apparent from the following description taken in connection with the drawings forming a part of this specification, and in which—

Fig. 1 is a schematic view of a braking system embodying the invention;

Fig. 3 is a fragmentary view of the fluid pressure producing device illustrating the pistons at the end of the compression stroke; and Fig. 4 is a sectional view substantially on line 4—4, Fig. 3.

Figure 2:
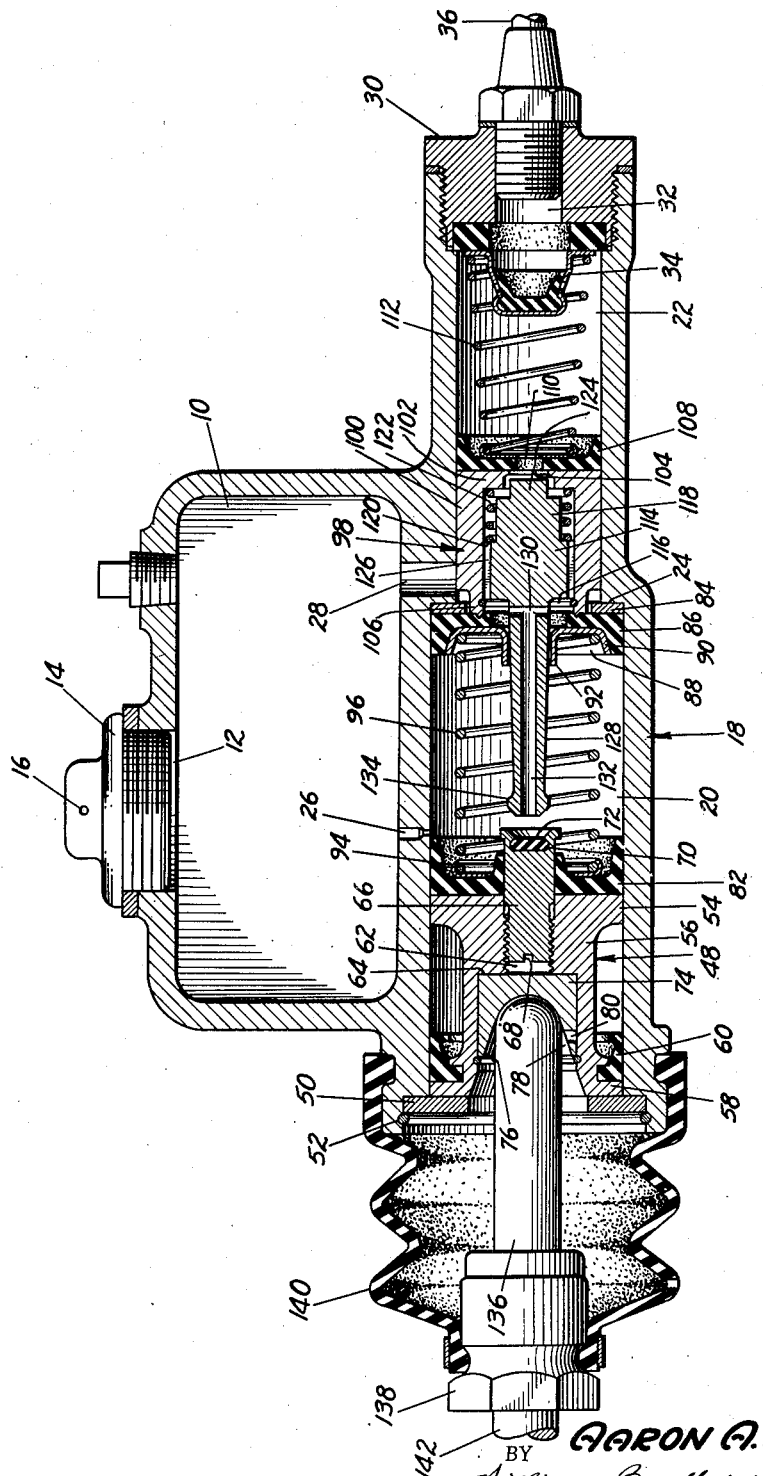
Fig. 2 is a vertical sectional view of the fluid pressure producing device illustrating the pistons in fully retracted position.

Referring to the drawings for more specific details of the invention, 10 represents a fluid reservoir having a filling opening 12 normally closed as by a plug 14 having openings 16 therethrough for venting the reservoir to the atmosphere. A cylinder 18 at the base of the reservoir includes a large chamber 20 and a relatively small chamber 22 arranged concentrically to and in direct communication with one another and providing at the junction of the large and small chambers an annular shoulder 24.

The large chamber has a port 26 providing a communication between the large chamber and the reservoir, and the small chamber has a port 28 adjacent its junction with the large chamber providing a communication between the small chamber and the reservoir. The small chamber also has a head 30 provided with a discharge port 32 controlled as by a two-way valve 34.

A fluid pressure delivery pipe or conduit 36 connected to the discharge port 32 has branches connected respectively to fluid pressure actuated motors 38, preferably arranged in pairs, one pair for actuating the brakes associated with the front wheels of a vehicle, and another pair for actuating the brakes associated with the rear wheels of the vehicle.

The brakes may be of conventional structure including a fixed support or backing plate 40 adapted to be secured to an axle or an axle housing, a rotatable drum 42 associated with the backing plate adaptable to be secured to a wheel, a pair of corresponding interchangeable friction elements or shoes 44 pivoted on the backing plate, a retractile spring 46 connecting the shoes, and a motor corresponding to one of the motors 38 mounted on the backing plate between the shoes and operative to actuate the shoes into engagement with the drum against the resistance of the retractile spring.

A piston 48 reciprocable in the large chamber 20 of the cylinder is held against displacement by a washer 50 seated on an annular shoulder in the wall of the cylinder adjacent the open end of the large chamber and secured in place as by a retaining ring 52 seated in a groove in the wall of the cylinder. The piston includes a head 54, a body 56, and a skirt 58, the latter having thereon a sealing cup 60 for inhibiting seepage of fluid from the cylinder.

The piston 48 has a double-diametral axial bore 62 providing at the junction of the large and small sections of the bore an annular shoulder 64. The small section of the bore has threaded therein an adjusting pin 66 extending beyond the head of the piston. The inner or threaded end of the pin has a diametral slot 68 for the reception of a hand tool by which the pin may be adjusted, and the free end of the pin has a recess 70 for the reception of a rubber disk or block 72. The large section of the bore has fitted therein a pressure block 74 seated on the annular shoulder 64 and held against displacement by a retaining ring 76 seated in a groove in the wall defining the bore. The pressure block has a concentric recess 78, the purpose of which will hereinafter appear, and one or more transverse bores 80 for the reception of a hand tool by which the block may be removed so that access may be had to the adjusting screw.

A sealing cup 82 sleeved on the adjusting pin 66 is seated on the head of the piston, and a washer 84 seated on the annular shoulder 24 at the junction of the large and small chambers of the cylinder supports a similar sealing cup 86. The inner perimeter of the cup 86 slightly overhangs the washer, the purpose of which will hereinafter appear, and nested in the cup 86 is a spring seat 88 having a marginal flange 90 complementary to the lip of the cup 86 and a short concentric sleeve 92. A spring seat 94 is nested in the cup 82, and a spring 96 interposed between the spring seats 88 and 94 serves to retain the assembly against displacement, and also to return the piston 48 to its retracted position.

A piston 98 reciprocable in the small chamber 22 of the cylinder includes a shell 100 open at one of its ends and closed at its other end as by a head 102 provided with an axial port 104. The periphery of the shell is cut away adjacent its open end to provide a short section 106 of reduced diameter adapted to enter the washer 84 and to seat on the sealing cup 86. A sealing cup 108 seated on the head 102 has an axial opening 110 of smaller diameter than the port 104 so that the perimeter defining the opening 110 overhangs the port 104, and a spring 112 interposed between the cup 108 and the two-way valve 34 controlling the discharge port serves to retain the cup and valve against displacement and also to return the piston to its retracted position.

A plunger 114 reciprocable in the shell is held against displacement by a retaining ring 116 seated in a groove in the wall of the shell. The plunger has a reduced portion 118 providing in conjunction with the body thereof an annular shoulder 120, and sleeved on the reduced portion between the annular shoulder 120 and the back of the head 102 is a spring 122 normally urging the plunger to its seat on the retaining ring 116. The plunger also has a concentric extension 124 adapted to enter the port 104 in the head 102 and to abut the overhanging perimeter of the sealing cup 108 when the plunger is in advanced position, and arranged in the circumference of the plunger are a plurality of passages 126 providing for movement of fluid past the plunger.

The plunger has on its back a concentric metering pin 128 having an axial passage 132 and a diametral passage 130 adjacent its base. Preferably the pin tapers gradually from its base or junction with the plunger toward its free end, and the pin has adjacent its free end a shoulder 134. The free end of the metering pin is adapted to enter the recess 70 in the end of the adjusting pin 66, and seat on the rubber disk 72, and the shoulder 134 seats on the end of the adjusting pin.

A thrust pin 136 has one of its ends seated in the recess 78 in the back of the pressure block 74, and the other end of the thrust pin has thereon a coupling 138 connected to the open end of the cylinder by a flexible boot 140 for the exclusion of dust and other foreign substances from the cylinder. A rod 142 has one of its ends connected to the coupling 138 and its other end pivotally connected to a foot pedal lever 144 mounted for oscillation on a stub shaft 146 and connected by a retractile spring 148 to a fixed support 150.

In a normal operation, upon depressing the foot pedal lever 144, force is transmitted therefrom to the rod 142 and the thrust pin 136 to the piston 48, resulting in moving the piston on its compression stroke. During the initial movement of the piston on its compression stroke, the sealing cup 82 covers the port 26, and, thereafter, as the piston advances, the fluid in the large chamber 20 is displaced therefrom, through the passages 130 and 132 in the metering pin 128 into the shell 100 of the piston 98, thence through the passages 126 in the plunger 114 and the port 104 in the head of the piston 98 into the small chamber 22, thence past the two-way valve 34, through the discharge port 32 and fluid pressure delivery pipes 36 into the fluid pressure actuated motors 38, causing energization of the motors and resulting in actuation of the friction elements or shoes 44 into engagement with the drum 42 against the resistance of the retractile springs 46.

At the conclusion of this operation, the piston 48 has traveled sufficiently to engage the adjusting pin 66 with the metering pin 128 and to effectively seal the passage 130 in the metering pin. Thereafter, as the piston 48 advances, force is transmitted therefrom through the adjusting pin 66 and the metering pin 128 to the plunger 114, resulting in moving the plunger so that the extension 124 of the plunger enters and closes the port 104 in the head 102 of the piston 98, and thereafter the pistons 48 and 98 move in unison as one unit.

Simultaneously with the closing of the port 104 in the head of the piston 98, the pressure on the fluid in the system is transferred from the piston 48 to the piston 98, and as the pistons proceed on their compression strokes the fluid in the chamber 20 forward of the piston 48 is metered therefrom through the sleeve 92 into the small chamber 22 back of the piston 98, and thence into the reservoir by way of the port 28.

The metering of the fluid from the chamber 20 is controlled by the metering pin 128 cooperating with the sleeve 92, hence the fluid may be metered from the chamber 22 in small increments so that the pressure on the fluid in the chamber 20 may oppose a gradually decreasing resistance to the movement of the piston 48. This gradually decreasing resistance to the movement of the piston 48 is such that the transition from low to high pressure is effected over a wide range, and, consequently, is not perceptible to the operator.

Upon release of the applied force on the foot pedal lever 144, the lever is returned to its retracted position under the influence of the retractile spring 148. This movement of the lever retracts the rod 142 and the thrust pin 136, resulting in release of the piston 48, whereupon the springs 96 and 112 become effective to return the pistons 48 and 98 to their retracted positions.

Due to the load on the spring 96, the piston 48 returns to its retracted position slightly in advance of the return of the piston 98 to its retracted position, and as the piston 48 returns to its retracted position a partial vacuum is created in the chamber 20, resulting in drawing fluid from the reservoir, through the port 28, into the small chamber 22, thence through the passages 130 and 132 in the metering pin and also through the sleeve 92 past the metering pin into the chamber 20, completely filling the chambers 20 and 22.

As the piston 98 moves to its retracted position, relative movement between the shell 100 and the plunger 114 is effected by the spring 122 interposed between the shell and the plunger. This results in opening the port 104 in the head 102 of the piston 98 and establishing communication through the piston, and when the piston assumes its fully retracted position it seats on the sealing cup 86 and closes the communication between the chamber 22 and the reservoir.

Simultaneously with this movement of the piston 98 fluid is returned to the chamber 22 from the fluid pressure actuated motors 38 and the fluid pressure delivery pipes connecting these motors to the chamber 22. Under this condition the fluid received by the chamber 22 may be in excess of the quantity necessary to completely fill the chamber, and under such conditions the excess fluid is displaced therefrom through the port 104 in the head of the piston 98 into the small shell 100, thence through the passages 126 in the plunger and the passages 130 and 132 in the metering pin into the chamber 20, thence through the port 26 into the reservoir.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. In a hydraulic brake system of the class described, the combination of a reservoir, a large cylinder, a small cylinder communicating with said large cylinder, a piston in each cylinder, means whereby fluid may be supplied to said cylinders from said reservoir, means for operating said pistons, a lost motion connection between said pistons whereby one of said pistons is stationary until the other piston has effected a predetermined movement, means interposed between said cylinders and controlling communication therebetween, said means providing an orifice through which fluid may return to the reservoir from the large cylinder, and a metering pin carried by one of said pistons for variably restricting said orifice.

2. A fluid pressure producing device comprising a cylinder including a large chamber and a small chamber, a piston reciprocable in the large chamber, a piston reciprocable in the small chamber having a port, a diaphragm intermediate the pistons having an orifice, a reservoir, means establishing communication between said orifice and said reservoir, a plunger movable in the piston in the small chamber controlling the port, and a metering pin on the plunger extending through the orifice into the path of travel of the piston in the large chamber.

3. A fluid pressure producing device comprising a reservoir, a cylinder supplied therefrom including a large chamber and a small chamber, a piston reciprocable in the large chamber having an adjusting pin, a piston reciprocable in the small chamber having a port, a diaphragm intermediate the pistons having an orifice, means establishing communication between said orifice and said reservoir, a plunger movable in the piston in the small chamber for control of the port, and a metering pin carried by the plunger extending through the orifice in the diaphragm into the path of the adjusting pin.

4. A fluid pressure producing device comprising a reservoir, a cylinder associated therewith including a large chamber and a small chamber each having a port communicating with the reservoir, a piston reciprocable in the large chamber, an adjusting pin carried by the piston, a piston reciprocable in the small chamber having a port, a diaphragm intermediate the pistons having an orifice in communication with the port connecting the small chamber with the reservoir, a plunger carried by the piston in the small chamber controlling the port in the piston, and a metering pin carried by the plunger extending through the orifice in the diaphragm into the path of the adjusting pin.

5. A fluid pressure producing device comprising a reservoir, a cylinder including a large chamber and a small chamber each having a port communicating with the reservoir, a piston reciprocable in the large chamber, an adjusting pin carried by the piston, a piston reciprocable in the small chamber having a port extending therethrough, an orificed diaphragm intermediate the pistons and the ports providing communications between the respective chambers and the reservoir, the orifice in said diaphragm being in communication with the port connecting the small chamber with the reservoir, a plunger movable in the piston in the small chamber controlling the port in the piston, a metering pin carried by the plunger extending through the orifice in the diaphragm into the path of the adjusting pin, said metering pin opening on the respective sides of the diaphragm.

AARON A. LOWEKE.